United States Patent [19]

McCalmont et al.

[11] Patent Number: 5,621,789
[45] Date of Patent: Apr. 15, 1997

[54] METHOD AND SYSTEM FOR INTEGRATING A PLURALITY OF CALL CENTER AGENT PERFORMANCE ENHANCEMENT MODULES

[75] Inventors: David T. McCalmont, San Jose; Bruce L. Hitson, Mountain View, both of Calif.; Michael J. Maloney, Plano, Tex.

[73] Assignee: Teknekron Infoswitch Corporation, Fort Worth, Tex.

[21] Appl. No.: 115,524

[22] Filed: Sep. 1, 1993

[51] Int. Cl.$^6$ ........................................... H04M 3/50
[52] U.S. Cl. ............................ 379/265; 379/96; 379/113
[58] Field of Search ................................ 379/265, 266, 379/210, 211, 212, 112, 113, 96

[56] References Cited

U.S. PATENT DOCUMENTS

| | | | |
|---|---|---|---|
| 4,510,351 | 4/1985 | Costello et al. | 379/112 |
| 4,694,483 | 9/1987 | Cheung | 379/265 |
| 4,763,353 | 8/1988 | Canale | 379/266 |
| 5,179,589 | 1/1993 | Syu | 379/265 |
| 5,299,260 | 3/1994 | Shaio | 379/266 |
| 5,499,291 | 3/1996 | Kepley | 379/265 |

OTHER PUBLICATIONS

ISD/ACD Infoswitch Digital Automatic Call Distributor, Product Specification, Document #610061, pp. 8–27.
Aspect Call Center, Product Specification, Release 2–0, Chapters 10, 11 and 13, May 23, 1988.

*Primary Examiner*—Ahmad F. Matar
*Attorney, Agent, or Firm*—Baker & Botts, L.L.P.

[57] ABSTRACT

A system for integrating a plurality of call center agent subsystem modules to assist a call center agent in efficiently responding to customer calls includes a workstation that has a central processing unit for interfacing the call center agent with a call distribution system. Within the workstation, there are a plurality of modules that are integrated in a way that significantly improves the call center agent's ability to provide completely responsive and efficient service to customers. The integrated modules of the present invention deliver at a single place under the control of the call center agent voice, data, and images by which the agent can completely service a customer call.

3 Claims, 9 Drawing Sheets

METHOD AND SYSTEM FOR INTEGRATING A PLURALITY OF CALL CENTER AGENT PERFORMANCE ENHANCEMENT MODULES

TECHNICAL FIELD OF THE INVENTION

The present invention relates to telecommunications systems and, more particularly, to a method and system for integrating a plurality of call center agent performance enhancement modules that improves the ability of a call center agent to interface with a telecommunications system, to assess his or her own performance in responding to calls, and that makes accessible to the call center agent a plurality of host applications in a rapid and easy-to-use manner.

BACKGROUND OF THE INVENTION

In a customer call center, a call center agent communicates with customers through both in-bound and out-bound calls. This communication is through a voice connection to a telephone switch that the call center agent controls from a workstation. At the workstation, the call center agent typically uses a variety of instruments to interface with application modules to obtain necessary information for the call center agent to service the customer, monitor and record certain statistics relating to the call center agent's performance, and display images or hard copies of documents relating to the customer's account. Additionally, the call center agent uses a variety of interfaces with host data processing systems and internal communication systems at the call center to properly respond to the customer calls. At a bare minimum, the call center agent uses separate telephone instruments to service voice transactions and a personal computer or similar computer device to process data transactions. This makes responding to a high volume of calls essentially prohibitive. If there were a way that a call center agent could avoid having to use so many different sources of information to respond to customer calls, the overall efficiency of the call center agent would improve. This efficiency improvement could cause significant cost reductions in the daily operation of a customer call center.

Consequently, there is a need for a method and system that permit a call center agent to avoid using of separate telephone instruments to handle voice transactions and other systems in handling data transactions associated with customer calls.

SUMMARY OF THE INVENTION

The present invention, therefore, provides a method and system for integrating a plurality of call center agent facilities that overcomes or substantially reduces limitations associated with existing methods for responding to customer calls in a call center.

According to one aspect of the present invention, there is provided a system for integrating a plurality of call center agent subsystem modules to assist a call center agent in efficiently responding to customer calls and that includes a workstation that has a central processing unit for interfacing the call center agent with a call distribution system or telephone switch. Within the workstation, there are a plurality of modules that are integrated in a way that significantly improves the call center agent's ability to provide completely responsive service to customers. The integrated modules of the present invention deliver at a single place under the control of the call center agent voice, data, and images by which the agent can completely service a customer call.

The modules include an agent interface module that permits the call center agent to control the interface between the call distribution system and the workstation. Another module in the workstation is an agent productivity statistics module that reports to the agent performance statistics that the agent generates in responding to calls. By generating to the agent performance statistics in real time, the agent productivity statistics module permits the agent to monitor his or her effectiveness in responding to customer calls. Another module in the present invention is a host applications module that permits the agent to access host applications associated with the workstation in providing data and images of documents and other sets of information that the call center agent needs to properly respond to the customer calls. The workstation further includes an integration and control module that integrates the functions of the agent interface module, the agent productivity statistics module, and the host applications module as well as other modules within the workstation to substantially improve the performance of the call center agent in servicing both in-bound and out-bound calls through the call distribution system.

A technical advantage of the present invention is that it improves both call center agent and call center productivity by seamlessly integrating applications that use voice, data, networking, and computing technology to the benefit of the calling customer. The present invention includes a set of related subsystem modules. Some of the modules directly support activities of an agent in a customer service center. Other subsystem modules support the functions of a call center supervisor. The present embodiment of the present invention uses an icon-based user interface and linkage mechanism to other standard applications for further improving the integration that the present invention provides.

Another technical advantage of the present invention is that it provides a hardware interface for data and voice connections between the workstation and the call distribution system. The hardware interface provides call status indicator lamps, dual head set connections for use by the agent and by an optional listener, a manual sign-on, call-answer, and call-release push buttons for disaster recovery operation. These further improve the ability of the call center agent to effectively and efficiently operate as at his or her call center workstation.

Yet another technical advantage of the present invention is that it provides to the call center agent the ability to concurrently run one or more host applications during a single work session while at the same time display at the workstation productivity statistics and telephone instrument function information relating to the operation of the call distribution interface through which the agent is communicating.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The present embodiment of the present invention is best understood by referring to the figures wherein like numerals are used like and corresponding parts of the various drawings.

Figure 1:
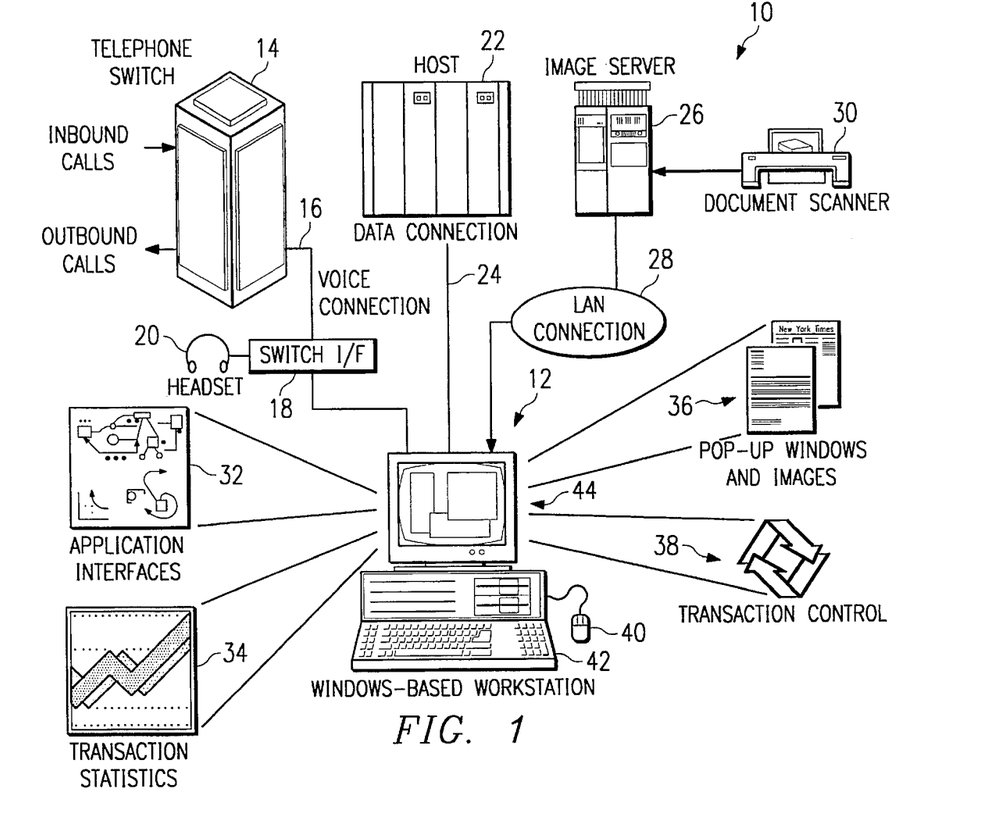
FIG. 1 provides a conceptual diagram of the integrated call center workstation capabilities of the present embodiment.

FIG. 1 shows a conceptual illustration of an integrated workstation 10 for delivering voice, data, and images to platform 12 to permit a call service representative or agent to service both in-bound and out-bound calls through telephone switch 14. As FIG. 1 illustrates, platform 12 permits a voice connection 16 through which the agent may control switch interface 18 and communicate through headset 20. Platform 12 operates, in the present embodiment, under a graphical user interface (GUI) system such as the Microsoft Windows® graphical user interface. Platform 12 may communicate to a host computer 22 that services platform 12 through data connection 24. Host computer 22 may serve a large number of platforms such as platform 12 within a call center as well as serving other functions related to call center operation. Image server 26 through local area network (LAN) connection 28 may provide a wide array of images for various host applications operable through platform 12. Additionally, document scanner 30 may connect in this call center environment to provide document images to image server 26.

Through the local processing capabilities within platform 12, as well as the processing and display features of host computer 22 and image server 26, platform 12 provides to the agent a robust set of application interfaces, as icon 32 represents, transactions statistics, as icon 34 represents, pop-up windows and images, as document symbol 36 depicts, and transaction control capabilities, as transaction symbol 38 represents. Through the use of mouse control 40 and keyboard 42, the agent may display on screen 44 an integrated set of images and data to assist him or her in responding to in-bound calls 46 and out-bound calls 48.

Figure 2:
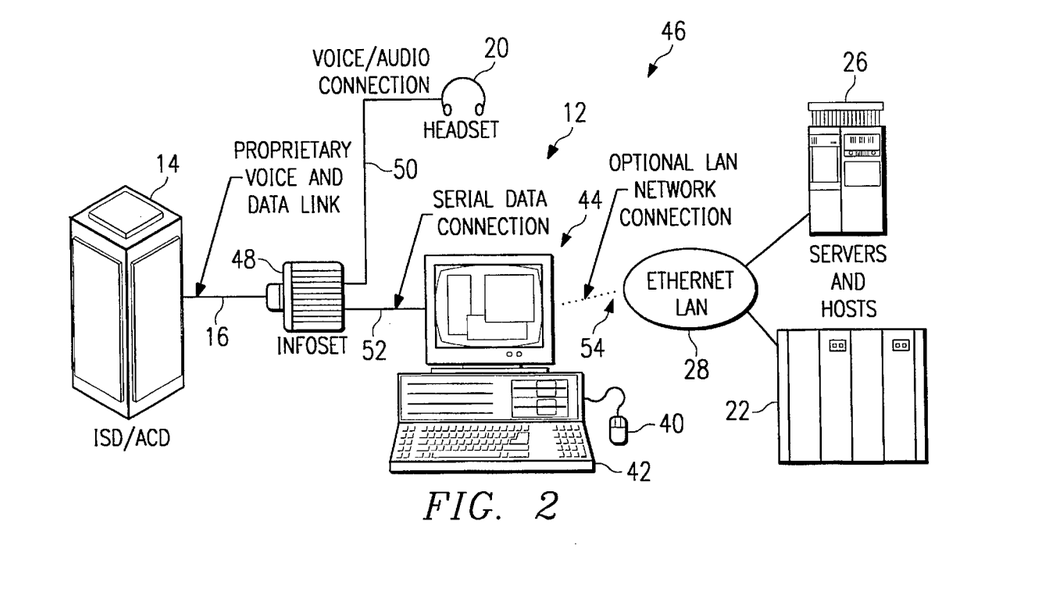
FIG. 2 provides a connection path diagram for one embodiment of the present invention.

FIG. 2 illustrates the basic connection path 46 of the present embodiment. From telephone switch 14, which may be a device known as an ACD or automatic call distributor manufactured by Teknekron Infoswitch Corporation of Fort Worth, Tex. or another manufacturer capable of producing an automatic call distributors, in-bound and out-bound calls travel along a priority voice and data link such as voice connection 16 to infoset or similar ACD hardware device 18 or similar device manufactured by Teknekron Infoswitch Corporation or similar manufacturer. From infoset 48, voice and audio signals flow to headset 20 through connection 50. Additionally, through serial data connection 52 data relating to the call goes to platform 12. Platform 12 communicates using communication path 54 with LAN 28 which may be an Ethernet local area network. Communication path 54 may be an optional LAN network connection. Through Ethernet LAN connection 28, connections go to image server 26 and host processor 22. Host processor 22 may also directly connect to workstation 12.

A recommended configuration for the present embodiment includes the use of the integrated collection of modules of the present invention on an IBM-compatible PC/AT or PS/2 computer. The following requirements support the system configuration for the present embodiment. These include a 486 or 386 CPU and 8 MB of main memory and a video adaptor and color monitor should be used. A video adaptor may be an XGA (1280×1024), a SVGA (800×600) or a VGA (640×840) video adaptor. Mouse 40 and a free serial port dedicated to the connection of the present invention to telephone switch 14 via a hardware interface device 18 should be used. The operating system and graphical user interface of the present embodiment include MS/DOS® v 5.0 and MS-Windows® v 3.1 or higher.

In the present embodiment, the supervisor console module uses a high-resolution video adaptor card with a 1 MB on-board memory as well as one additional serial port connection. Also, the host applications module requires an additional serial port connection or a LAN connection. An acceptable host session interface hardware and software for use with the present embodiment include those manufactured and sold by the Attachmate or Wall Data Corporations. Infoset 18 is unique with the system of the present embodiment for providing an interface to telephone switch 14 which may be an analog or digital ACD device as sold by Teknekron Infoswitch Corporation. A system of the present embodiment, on the other hand, may use other hardware providing an interface to telephone switch 14, which other manufacturers may produce.

A workstation as platform 12 may also be connected to a local area network which requires a network adaptor board. Software interfaces may be provided for most Ethernet and Token Ring network adaptors as described more fully below.

The present embodiment of the present invention includes an integrated collection of software modules that work together to enhance the productivity of customer service agents. In one embodiment, the system of the present invention integrates a full agent telephone instrument for in-bound and out-bound call handling and host applications in a single desktop personal computer that serves as platform 12 of FIG. 1. The system is designed to be installed in existing call centers that make use of separate telephone instruments to handle voice transactions and PCs to handle data transactions.

Although the present embodiment has particular use in benefitting the operations of a call center agent, the invention contemplates the generalized instance of an agent being any representative of any type of customer service center. This may include, for example, key entry operators or document verifications clerks and data processing centers, telephone representatives and reservation and sale centers, and support specialists on a help desk. The present invention improves agent and call center productivity by seamlessly integrating applications that utilize voice, data, networking and computing technologies.

The present embodiment consists of a series of related subsystem modules. Some of these modules such as the agentstation module and agent statistic module, directly support activities of an agent in a customer service center. Subsystem modules of the present embodiment such as a supervisor console module support the functions of the call center supervisor. Additionally, the present embodiment provides a user interface and linkage mechanism to other standard applications (such as host applications) through an icon-based display on screen 44.

The present embodiment, in addition to providing the functions of an integrated collection of software modules, further includes a hardware interface for connecting data and voice information between platform 12 and switch 14. Telephone switch 14 may be, for example, ISD/ACD automatic call distributor as manufactured by Teknekron Infoswitch Corporation of Ft. Worth, Tex. or another suitable manufacturer.

The present embodiment of the present invention may be designed on an IBM-compatible personal computer platform 12 operating under the Microsoft Windows® GUI in a MS-DOS® environment. Each of the modules of the collection of software modules in the present embodiment is controlled by the user through the use of the windows or icons described in FIGS. 5a, 5b, 6a, and 6b. These windows may, in most cases, be moved and controlled by the user within the Windows® environment.

Since the modules of the present embodiment are Windows®programs, they are by their nature event-driven, as opposed to sequence-driven, programs. Event-driven programs, rather than waiting in a loop for a user to enter a particular value at a keyboard, respond to user input such as a key command or a mouse click at any time. However, the interpretation of the asynchronous user input may differ from moment-to-moment, depending on which window or icon is active when the event is received.

As event-driven programs, the modules of the present embodiment respond to control through mouse 40. However, given that the present embodiment is primarily used in a production environment where increased productivity translates into reduced operating expenses, all commonly users functions are also accessible through accelerator keys, for example, data-keys sequences such as ALT+ [key]. Users have their chose of either using accelerator keys to drive particular operations from keyboard 42 or using mouse 40 for these same operations, if they prefer it.

Figure 3:
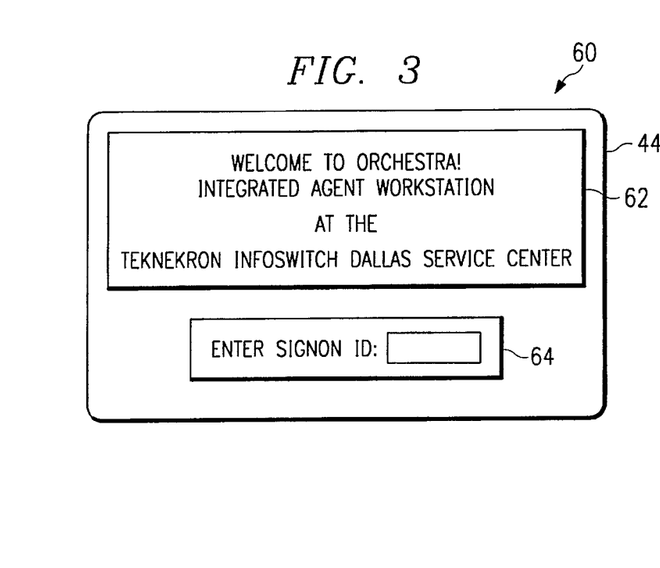
FIG. 3 shows a sign-on screen for use in accessing the integrated modules of the present embodiment.

To begin understanding how the present embodiment achieves its object, reference is made to FIG. 3. FIG. 3 shows an example of a sign-on screen 60 for the integrated agent workstation embodiment of the present invention. In FIG. 3, screen 44 of platform 12 screen 60 provides to a user welcome box 62 that informs the user of access to the integrated agent workstation modules of the present embodiment. Box 64 prompts the user to input through keyboard 42, for example, the user's identification name or number. Upon receiving the approved user identification, the user has access to the integrated agent workstation modules of the present embodiment. The system further has the capability of signing an agent onto the various applications throughout the system.

Figure 4:
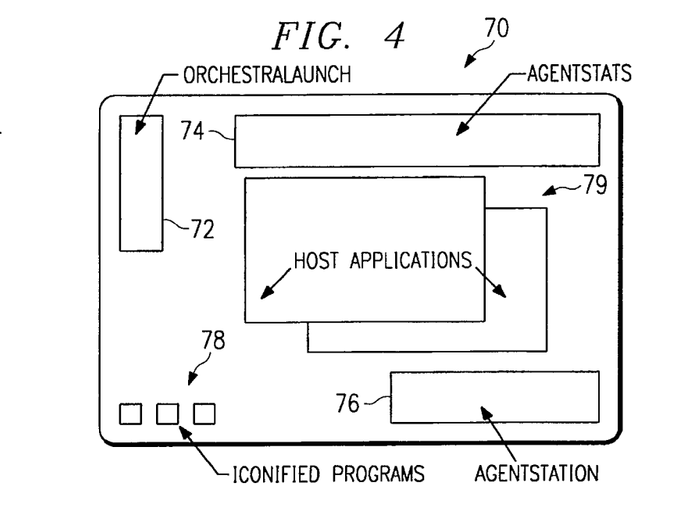
FIG. 4 shows a simplified capabilities overview screen of the present embodiment.

FIG. 4 shows capability screen 70 of one embodiment of the invention. In the following discussion, the term "Orchestra" is used interchangeably with the phrase present embodiment. The use of the term "Orchestra" while being a trademark shall in no way be understood to limit the scope of the present embodiment or of the invention itself. In capability screen 70, the user views Orchestra™ launch module window 72 to operate the launch module of the present embodiment, agentstats window 74 for operating the agentstats module of the present embodiment, agentstation window 76 for operating the agentstation module and icons various program 78 for accessing programs using the associated icons in the Windows® GUI. Within the integrated agent workstation module of the present embodiment, the agent also has access to a variety of host applications for using, generating, and retrieving information relating to a received or placed outbound customer call. These host applications are indicated by screen portions 79 of capability screen 70.

Figure 5A:
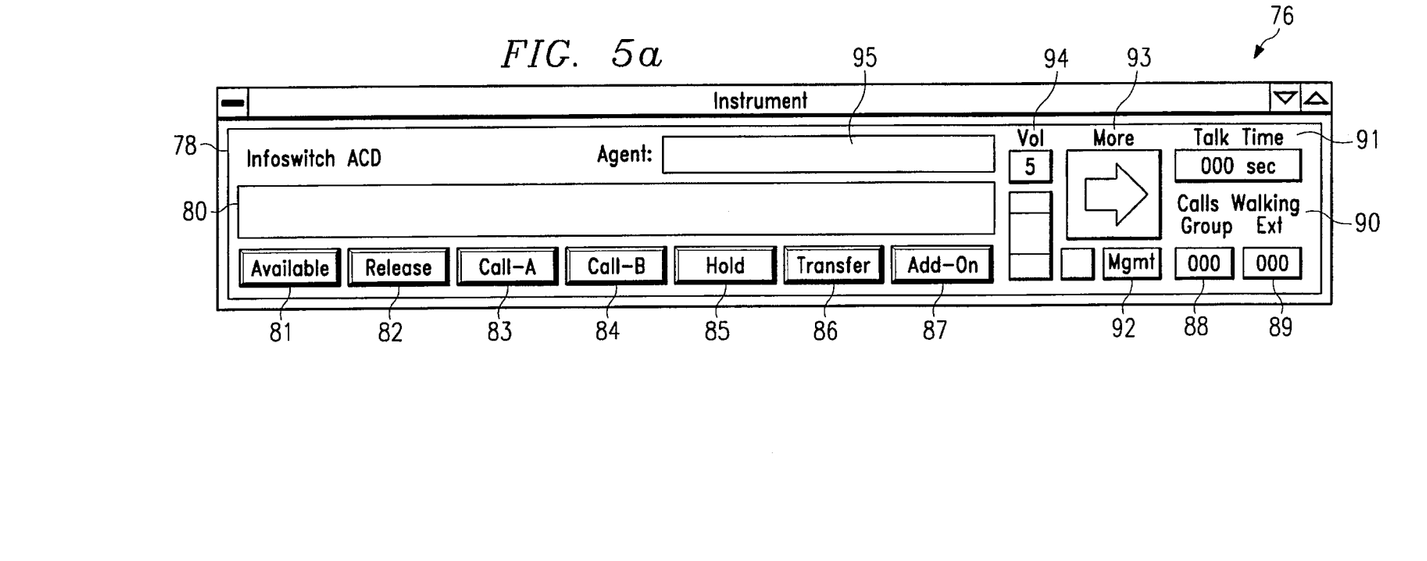
FIGS. 5a and 5b show in more detail the agentstation and agentstats windows of the screen of FIG. 4.

FIGS. 5a and 5b show in more detail the agentstation and agentstats windows of the FIG. 4 capabilities screen 70. Agentstation window 76 permits the user to access the agentstation module to control the telephone capabilities of hardware interface device 18 for controlling telephone switch 78. Telephone switch name of a telephone system, and informs the agent whether the workstation is talking to the telephone system. Display 80 shows call-type information, dialed digits and/or messages from the agent's supervisor. Agentstation window 76 also permits the agent to control a variety of functions associated with receiving and placing telephone calls. For example, AVAILABLE indicator 81 indicates whether the agent is available and permits the agent to control answering in-bound calls. RELEASE control indicator 82 permits the agent to terminate a call which takes the agent to an idle state from other states. CALL-A control indicator 83 permits the agent to accept a call or to place a call. CALL-B control indicator 84 permits the agent to place a call for consultation, transfer, or conferencing. Using HOLD control indicator 85, the agent can put a call on hold. TRANSFER control indicator 86 controls the transfer of a call from the agent to a dialed destination. ADD-ON control indicator 87 permits the agent to handle conference calls as well as extension-directed calls. CALLS WAITING/GROUP control indicator 88 shows the number of calls waiting for your agent group. CALLS WAITING/EXTENSION control indicator 89 shows the number of calls waiting for agents extension. Calls waiting indicator 90 quick flashes yellow for extension directed calls and slow-flashes yellow if the number of calls waiting for the agent group is above a predetermined threshold. TALK TIME control indicator 91 shows the number of seconds spent talking to a caller or spent in wrapping up a call. MUTE control indicator 92 shows and controls whether the caller can hear the agent. MORE control indicator 93 shows less-frequently used buttons. VOLUME control indicator 94 shows and controls the loudness of the caller's voice. Also, AGENT NAME control indicator 95 shows the name corresponding to the sign-on identifier that the agent used operating the present embodiment. Also, the "Agent" legend indicates agent call handling permissions. For example, there are three possible states including "Agent," "Supervisor," and "Master," each associated with the various permissions for handling agent calls.

Figure 5B:
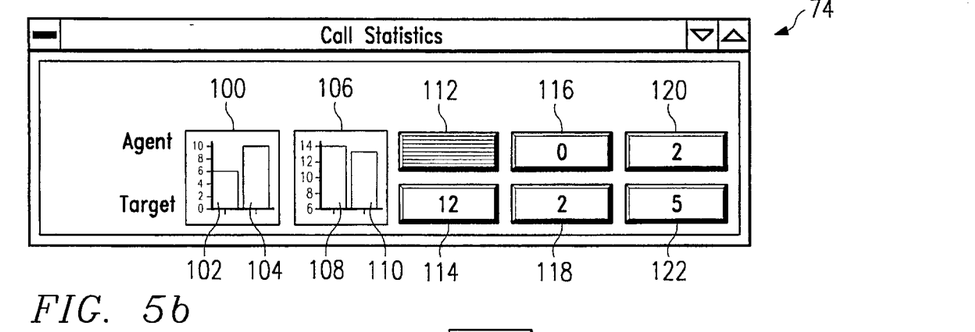

FIG. 5b shows in more detail agentstats window 74 of the present embodiment. Through agentstats window 74, a call center agent receives numerous statistics that indicate to the user the efficiency of his work. Efficiency statistics related to the agent's performance include agent statistics and target statistics. For example, chart 100 shows in real time the number of in-bound calls that the agent has received in column 102 so that the agent may compare the calls to a target number that column 104 shows. AVERAGE TALK TIME block 106 provides average talk time statistics for the agent in bar 108 to compare to a target level of bar 110. AVERAGE WRAP-UP TIMES for agent and a target appear in respective blocks 112 and 114, while out-bound statistics for agent and target appear in blocks 116 and 118. Idle time statistics for the agent and target appear in blocks. 120 and 122, respectively. Also, each of the five fields may be viewed in either format, either numerically or graphically. That is, although FIG. 5B illustrates two fields that are graphically viewed and three fields that are numeric, the fields may be either graphical or numeric according to the performances of the system user.

Figure 6A:
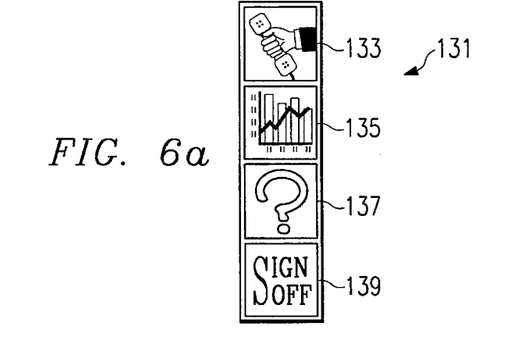
FIGS. 6a and 6b show in more detail the launch and help windows of the present embodiment.
Figure 6B:
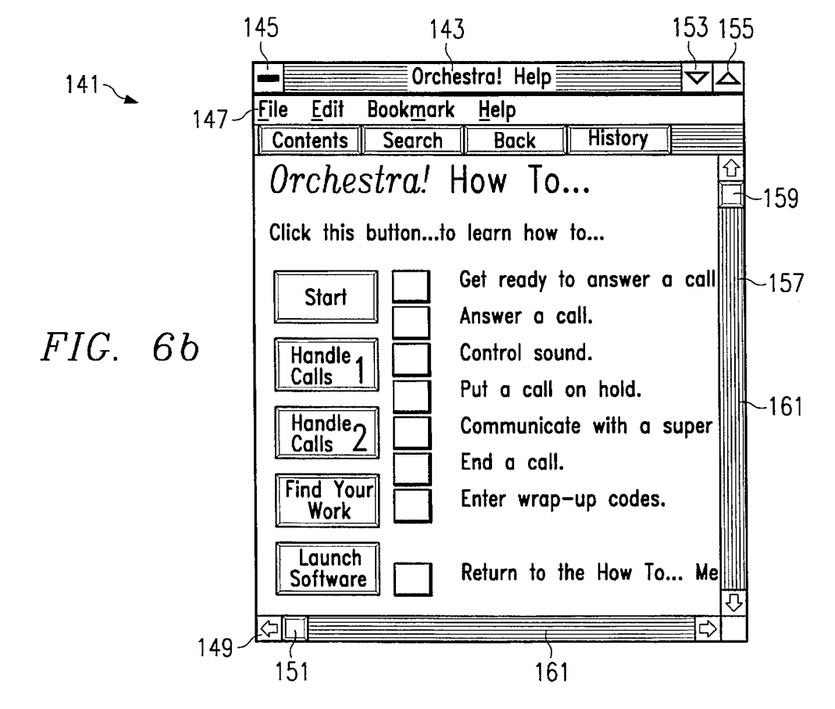

FIGS. 6a and 6b show further icons and windows for operating the present embodiment. In particular, FIG. 6a shows Orchestralaunch window 131 through which the operator accesses various modules within the present embodiment. For example, agentstation symbol 133 minimizes the telephone window and reopens the agentstation window through which the agent can control operation of the telephone. Agentstats symbol 135 opens and minimizes the agentstats window through which the operator can access the information from the agentstats module. Operation of agentstats symbol 135 opens or minimizes the window and reopens the window upon control by the operator. Orchestrahelp symbol 137 makes available to the operator the functions of Orchestrahelp module as described below in connection with FIG. 6b. Further, sign-off symbol 139 closes the various modules of the present embodiment it displays to the agent the sign-on window of FIG. 3. Note that additional icons may be added to the toolbar to control applications outside the system of the present embodiment.

FIG. 6b shows the Orchestrahelp window through which the agent may access the various help functions within the present embodiment. The particular components of Orchestrahelp window 141 include title bar 143 that permits the user to move the window and that, depending on its color, tells the operator whether the Orchestrahelp window is active. Note, however, that title bar 143 is applicable to all windows of the present embodiment. Control menu 145 permits the operator, as in most Windows® applications, permits the operator to close the Orchestrahelp window 141. Menu bar 147 allows the agent to carry out commands in the window and may not be present in all Windows®. Corner window 149 permits the operator to drag cursor 151 to reside the window. Minimize button 153 permits the operator to reduce the window to icon 137 of FIG. 6a, while maximize button 155 permits the agent to enlarge the window to fill the screen. Clicking a restore button on the enlarged screen returns the window to the original size. Window boarder element 157 permits the agent to re-size the window. Scroll bar 161 permits the agent to scroll the window by moving cursor 159 vertically. Operations of Orchestrahelp window 141 are essentially those provided by the Microsoft Windows® GUI application and provide various how-to instructions for operating the present embodiment.

The supervisor console module of the present embodiment permits the supervisor to manage operation of telephone switch 14. Supervisor console module provides graphical displays of agent, trunk, and call status and permits the supervisor to manipulate telephone switch 14 parameters. In the present embodiment, the supervisor console module runs in a full screen mode but may be "snap shot" into a window or icon for concurrent execution with other modules of the present system. For implementation, the supervisor console module requires a second free serial port to connect to the MIS (management information subsystem) portion of telephone switch 14.

An important module of the present embodiment is the engine module to which all other modules within the integrated collection of modules attach. The engine module provides inter-process communications between the modules of the present system and the telephone switch 14 via a device driver interface library to communicate with hardware interface 48.

Infoset 18 is an external hardware interface device that permits communicating between telephone switch 14 and platform 12. Infoset 18 provides a voice and data connection to telephone switch 14, serial connection 52 to platform 12 and an audio connection 50 to headset 20, (or handset) all through a standard module connectors. Additionally, infoset 18 provides front-panel LEDs for power and call-state indication. Manual push buttons are on infoset 18 for disaster recovery operation. Thus, the present embodiment provides the above-described first party control of a telephone switch. Moreover, the present embodiment permits first party control of further types of telephone switches. Even further, the present embodiment provides third party control using a local area network connections, for example, through a network server of other switches as well as those manufactured by Teknekron Infoswitch.

In addition to the integrated collection of modules that the present embodiment provides, an agent may concurrently operate one or more host applications during the same session. These host applications may be emulation sessions or data base applications as provided through host processor 22 to enable an agent to retrieve and manipulate data in responding to a customer call. The integrated collection of modules of the present embodiment are designed to run simultaneously with such host applications and to share information with them via the Windows® Dynamic Data Exchange (DDE) mechanism for inter-process communications, or via the EEHLLAPI (i.e., the Entry Emulator High Level Language Application Programming Interface) mechanism.

Normal Windows® programs may also be executed concurrently with a session using the present embodiment to provide access to word processing, electronic mail and other applications. These Windows programs, if present, may run in the foreground as the active process or may be suspended while calls are handled via the agentstation module. Incoming calls are defined as highest priority transactions. Therefore, all other active processes are automatically suspended when an agent is presented with an in-bound call.

When making the transition to a wrap-up mode the agent will be presented with a pop-up window that overlays all active windows. This window will operate in a nodal fashion, that is, the user must enter a value in this window prior to being allowed to continue. Platform 12 will beep if the user attempts to control any other window with mouse 40.

To prevent the entry of incorrect wrap-up codes, the agentstation module of the present embodiment provides automatic validated wrap-up entry. The wrap-up window presents a range of permissible wrap-up options and codes, as defined in the configuration file. These built-in wrap-up definitions may be changed by the system administrator. The agent may either select the desired item on the wrap-up list or enter a sequence of wrap-up digits. Regardless of the selection method, the wrap-up code is then validated against the on-line data base of permissible options and, if a valid wrap-up entry is found, its transmitted to the switch.

For telephone number dialing, a pop-up numeric key pad appears. This window is also nodal, that is, the user must enter a value on the key pad or elect to cancel the operation prior to being allowed to continue. Platform 12 will beep if the agent attempts to enter an illegal (e.g., an alphabetic) value or attempts to access another window. Once the telephone number is selected (either from the speed-dial list or via manual entry) that number is transmitted to the switch for out-bound or extension dialing.

Figure 7:
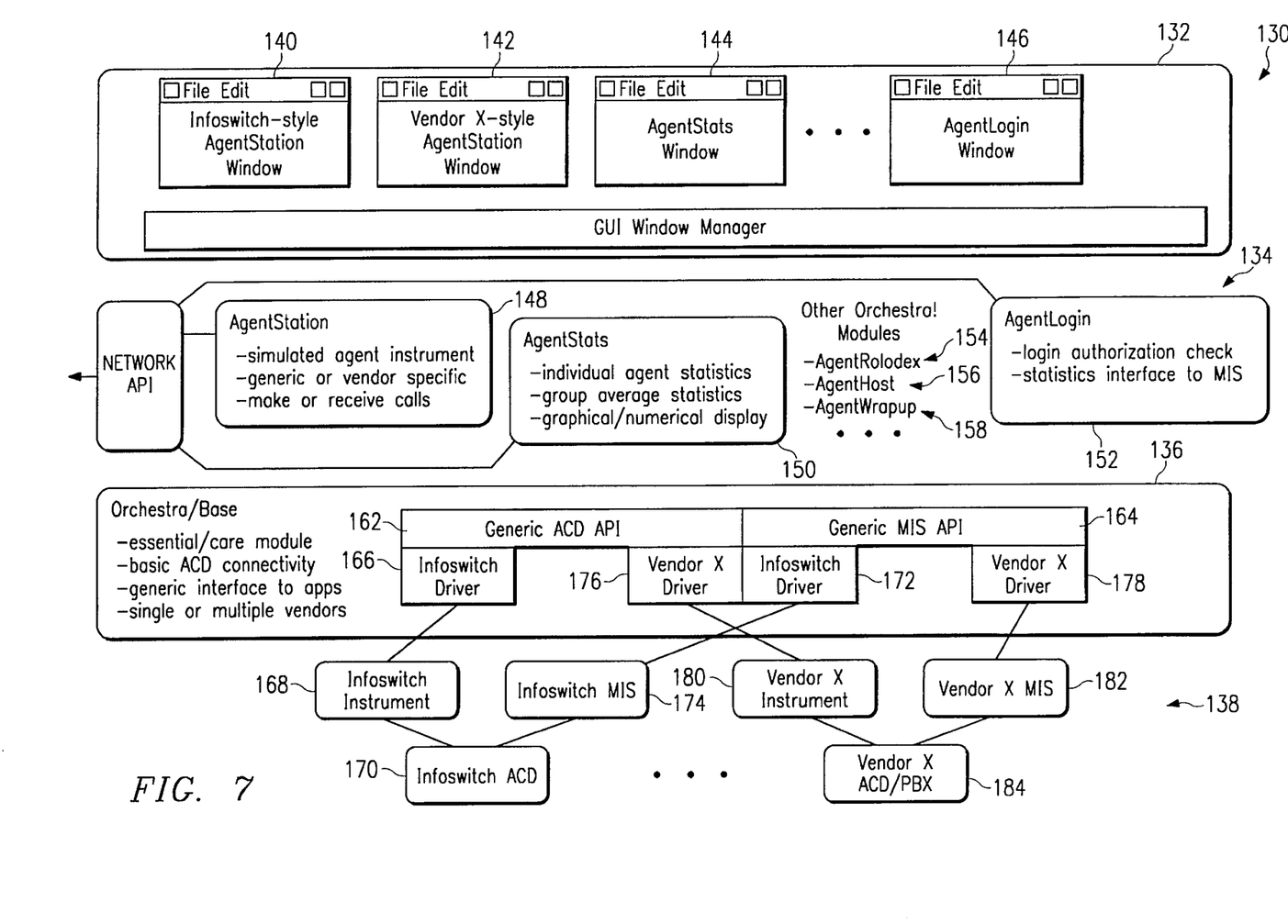
FIG. 7 illustrates the basic architecture of the present embodiment.

To understand more completely the architecture of the present embodiment, FIG. 7 shows architecture diagram 130. In architecture diagram 130, graphical user interface (GUI) window manager 132 provides an overlay for modules 134 which operate over application program interface (API) base 136. API base 136 controls the associated equipment at equipment level 138.

GUI window manager 132 permits the agent to use agentstation window GUI 140 to access the agent functions for telephone instruments manufactured by Teknekron Infoswitch Corporation of Fort Worth, Tex. or, agentstation window GUI 142 for some other vendor or telephone instruments. Other management GUI's include agentstats window GUI 144, as well as various others, including agentlogin window GUI 46. Through these various GUI's, modules of the present embodiment are accessible to agents. These modules include agentstation module 148, agentstats module 150 and agent login module 152 (other modules of the present embodiment may include an agent rolodex module 154, agent host module 156 and agent wrap-up module 158. Each of these modules is accessible to a variety of connections including, for example, a local area network via network API 160. Each of these modules interfaces the associated equipment that it controls through the API base 136. Within API base 136 are, for example, a generic ACD API 162 and a generic MIS API 164. These API's control the ACD through a driver such as Infoswitch driver 166 for operating an Infoswitch instrument control set 168. Infoswitch instrument control set 168 controls Infoswitch ACD 170 while from generic MIS API 164, Infoswitch driver 172 sends commands to Infoswitch MIS control set 174 to control the MIS interface in operation of Infoswitch ACD 170. For variety of ACD's or PBX's, generic ACD API 162 and generic MIS API 164 can control respective vendor drivers 176 and 178, for example to control the associated vendor instrument control set 180 and vendor MIS control set 182 to control the vendor-provided ACD or PBX 184.

Figure 8:
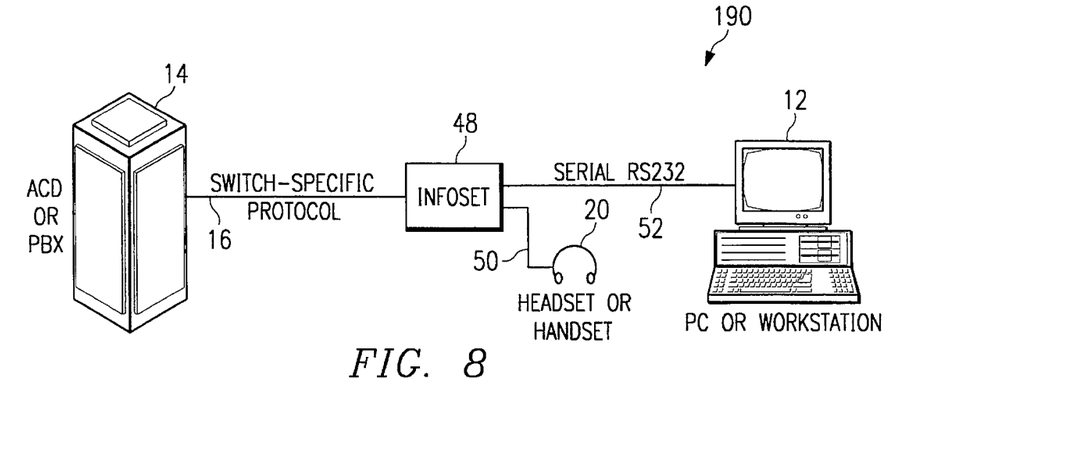
FIG. 8 shows one direct connect path for operating the present embodiment.

FIGS. 8 through 11 show exemplary scenarios through which the present embodiment may operate. Referring to FIG. 8, there appears the first way that the present embodiment can connect to a switching device such as ACD 14. For example, connection path 190 may be from PC workstation 12 through serial connection 52 to the infoset 18 or a similar voice and data connection device that another manufacturer may produce. From infoset 18, a switch-specific protocol datalink 16 connects to ACD or PBX 14. Also, from infoset 18, a voice/audio connection 50 permits the agent to monitor and use the audio portion of the telephone transaction in various modules described in connection with FIG. 7.

Figure 9:
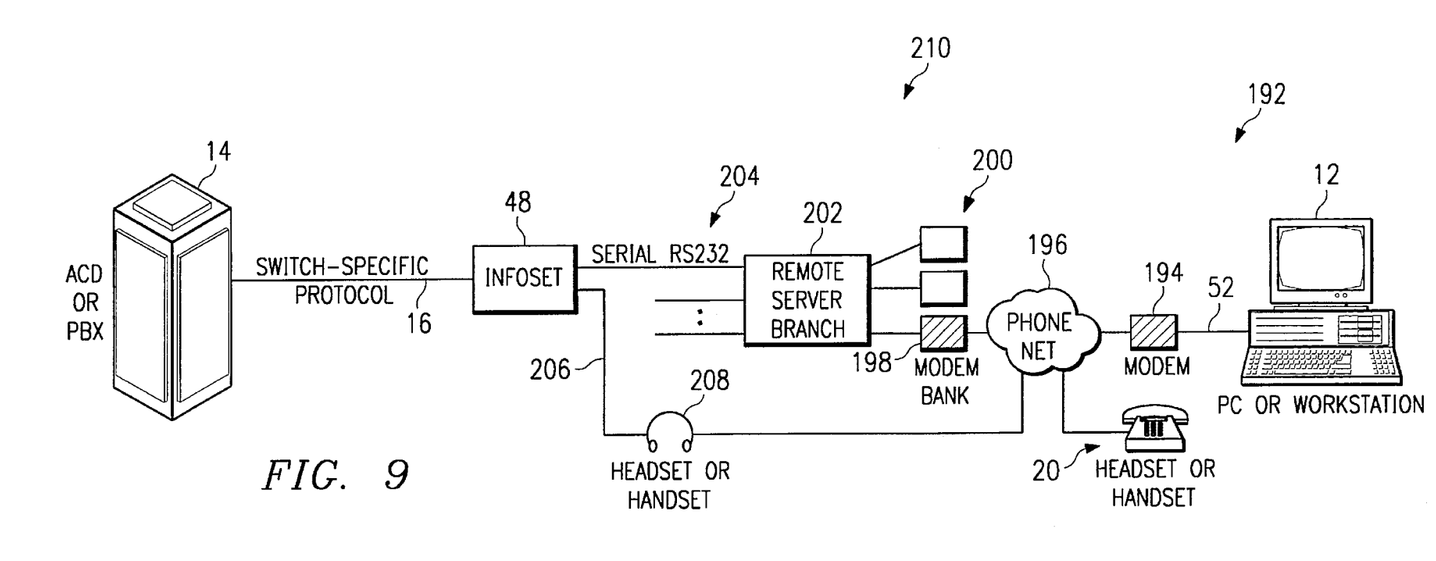
FIG. 9 shows an alternative direct connect path for operating the present embodiment through a phone network.

FIG. 9 shows an alternative connection path 192 that connects PC workstation 12 through serial connection 52 to a modem 194. Modem 194 connects to headset or handset 20, while communications occur through phone network 196 to a remote modem 198 that is part of modem bank 200 and remote location 210. Communications from modem bank 200 go to remote server branch 202 where they proceed along serial RS 232 connection 204 to infoset circuit 18. From infoset circuit 18, line 16 connects to ACD 14. Infoswitch circuit 18 may be one of numerous infoset circuits that exist at the remote location. Also, from infoset 18 is voice/audio connection 206 to interface device 208 at remote location 210. This connects to modem 198, which connects through phone network 196 to modem 194.

Figure 10:
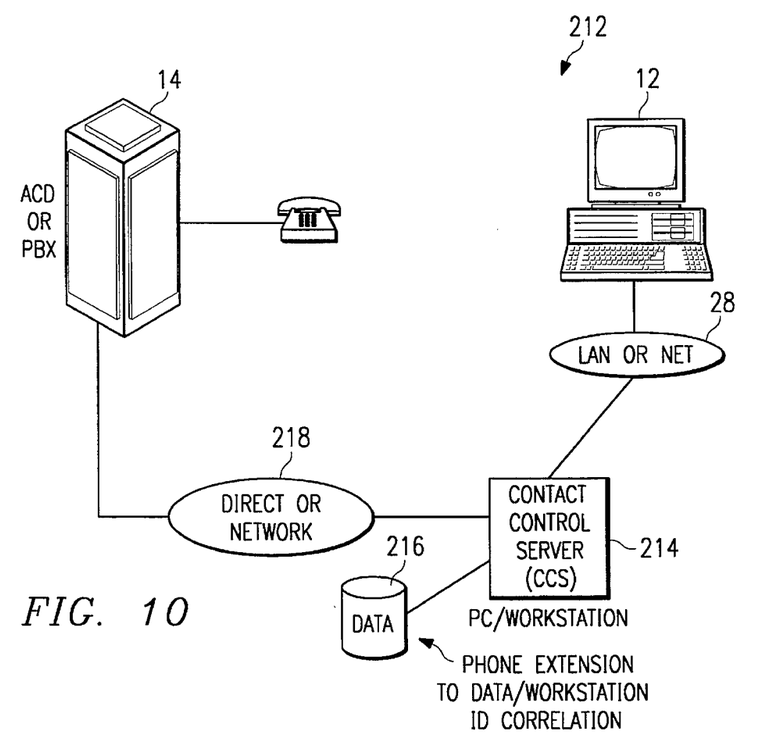
FIGS. 10 and 11 show alternative gateway connect paths for operating the present embodiment.

FIG. 10 shows a gateway connect path 212 for on-site use on the present embodiment that relates to the on-site direct connection of FIG. 8. In communication flow before gateway connect path 212, connections from desktop platform 12 go to LAN connection 28 to contact control telephony server 214. From contact control server 214, such functions as identification correlation and other uses of data are possible by use of data in database 216. Communications between contact control telephony server 214 and ACD 14 may be either direct or through a local area network as connection point 218 indicates.

Figure 11:
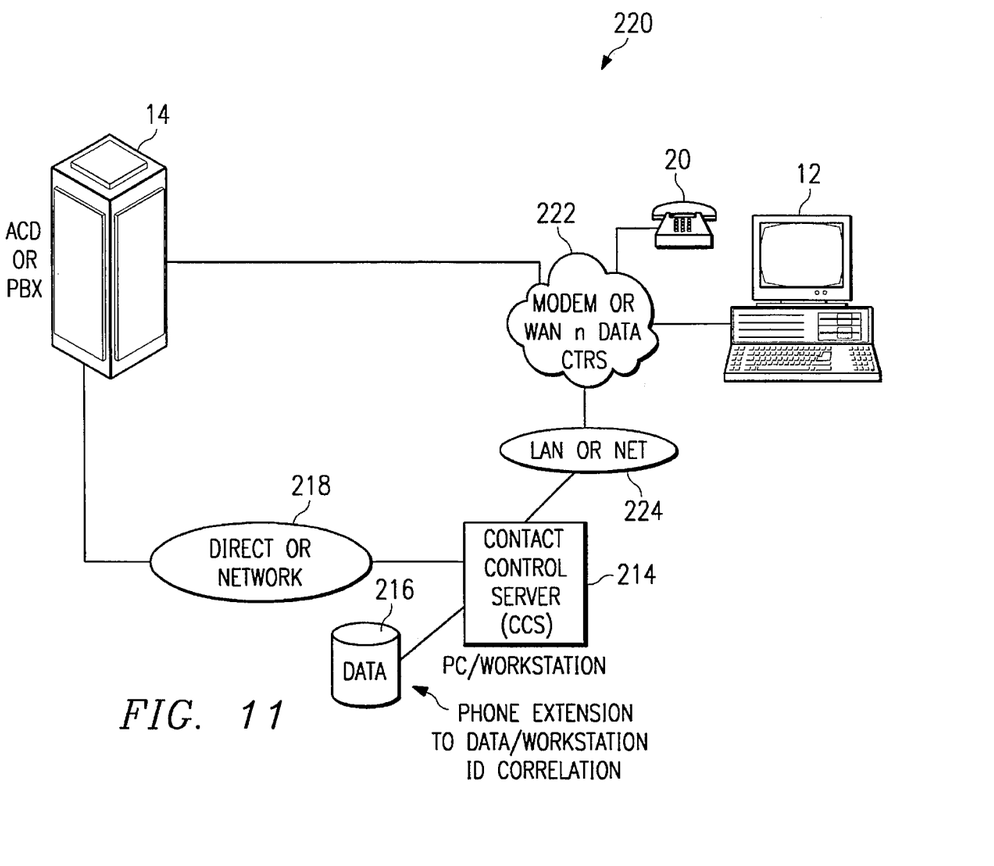

FIG. 11 shows gateway connect path 220, which is similar to gateway connect path 212 of FIG. 10. Beginning at desktop platform 12, connection is made to ACD 14 and LAN or NET 224. Headset or handset 20 connects to ACD 14 and is controlled from workstation 12 via LAN 224. LAN or network connection 224 connects to contact control server 214 that uses data from database 216 and that connects to connection point 218. From connection point 218, communications flow between contact control server 214 and ACD 14.

Figures 12, 13:
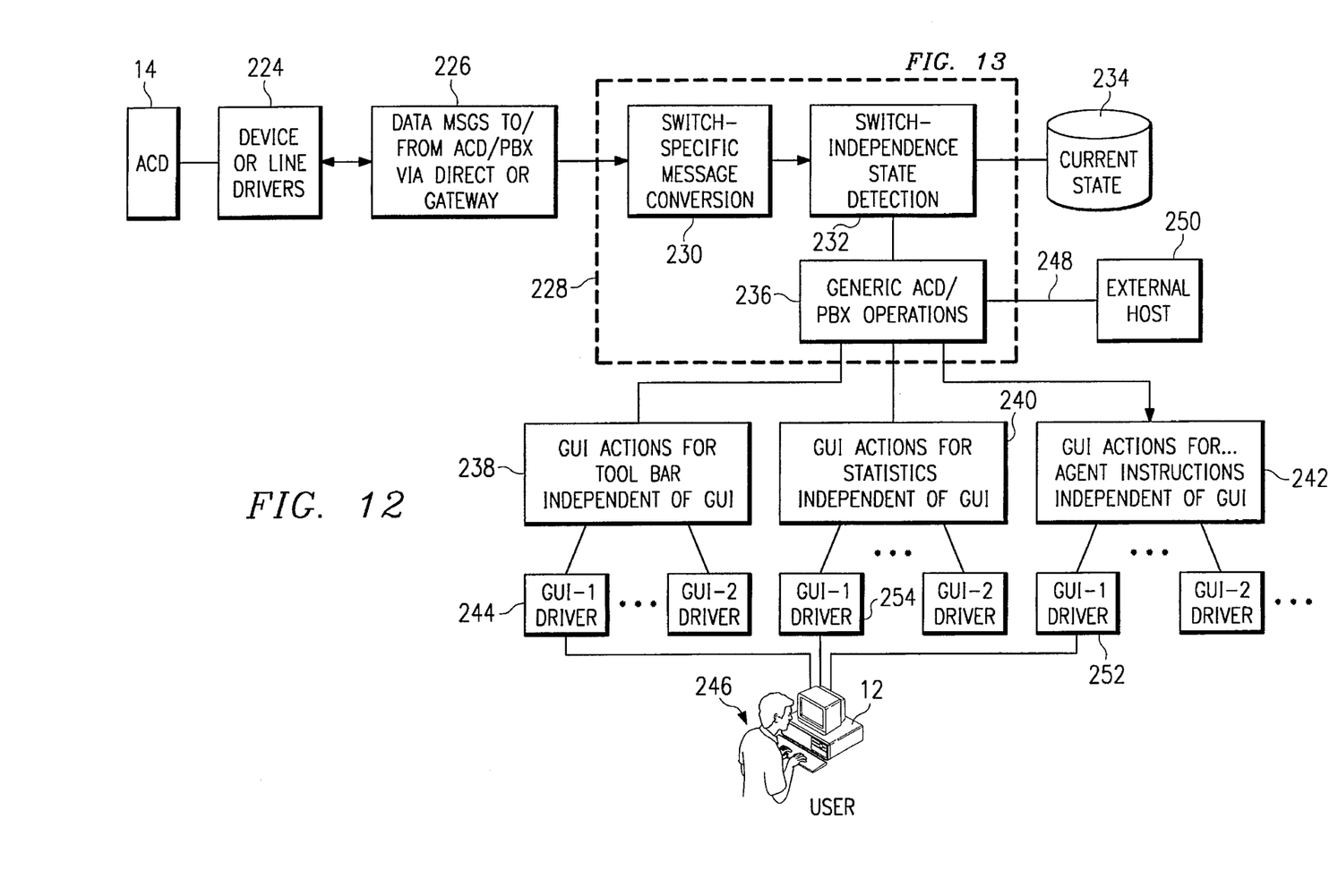
FIG. 12 provides a flow diagram according to the present embodiment for data and information flow between a telephone switching system and a desktop platform.
FIG. 13 shows in more detail generic ACD operations that occur on the data flow of FIG. 12.
Figure 13:
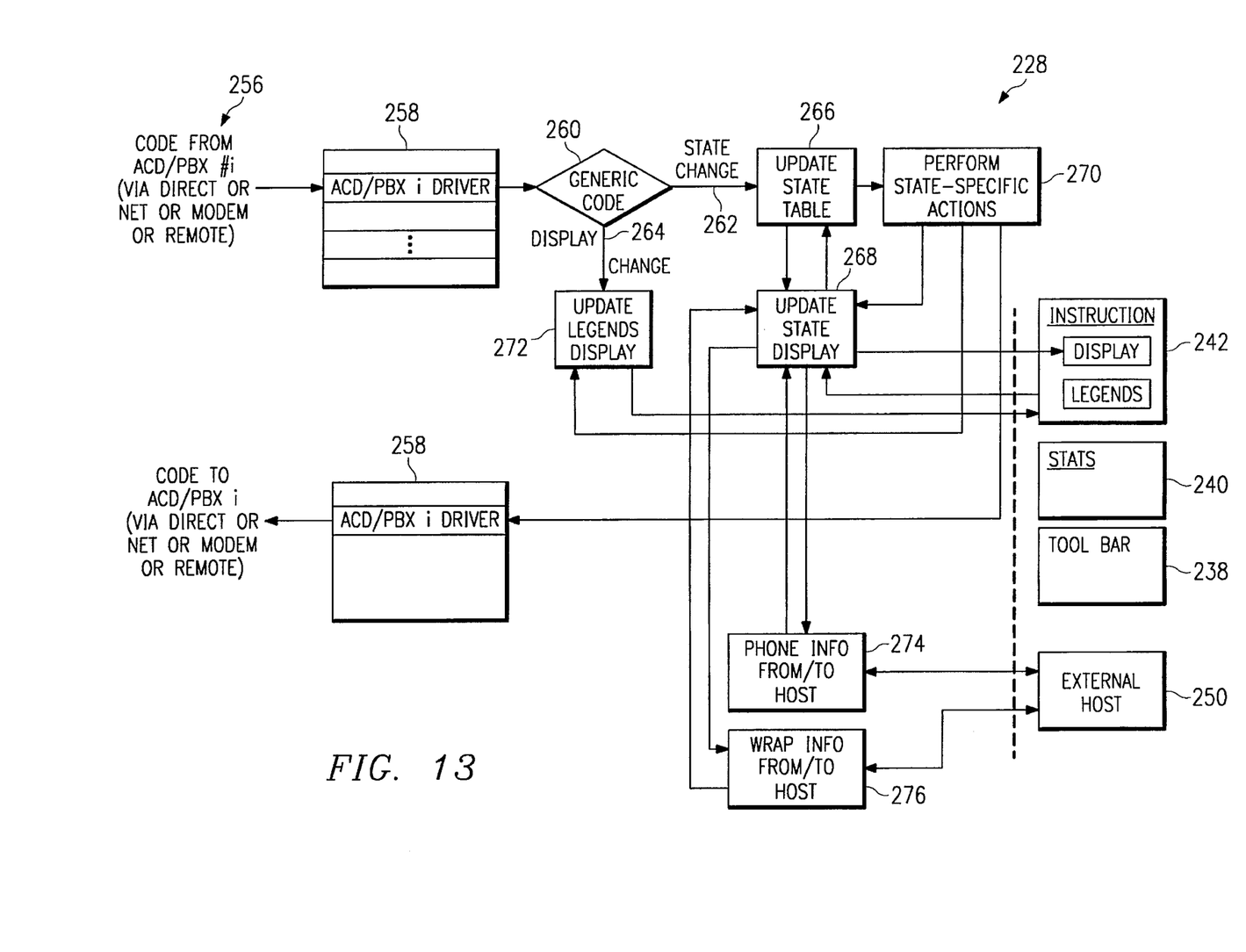

FIG. 12 shows the data and information flow within the present embodiment of the present invention. Beginning at ACD 14, communications go to device or line drivers 224 for communication using various data messages to and from the ACD via the direct or gateway paths shown above in FIGS. 8 through 11, as data flow block 226 indicates. From data flow block 226, communications proceed to a generic ACD operations set as indicated by dash line 228 that is shown more particularly below in FIG. 13 and described more fully below. One of the operations within ACD operations block 228 is the process of switch-specific message conversion, as block 230 indicates. From switch-specific message conversion block 230, messages flow to switch-independent state detection block 232. Switch-independent state detection block 232 takes the current state from base 234 and controls generic ACD/PBX operations, as block 236 illustrates. From generic ACD operations block 228, various ACD/PBX operations can occur, such as GUI actions for a tool bar independent of the GUI, as block 238 illustrates; GUI actions for statistics independent of the GUI, as block 240 illustrates; and GUI actions for agent instruction independent of GUI as block 242 illustrates. From each of blocks 238, 240 and 242, instructions go to GUI drivers such as GUI-1 driver 244 to drive the appropriate interface for operator 246 to use. Additionally, generic ACD/PBX operations can control the operation of an external host as indicated by connection 248 to external host block 250.

Numerous types of flow within the present embodiment are possible. Several common scenarios, however, include a change in the ongoing switch status display, operations relating to operator-initiated actions such as initiating a call, and the operations that occur when a new tool or application is launched. The following discussion describes the data flow for these exemplary operations. In changing the ongoing switch and status display, data flow begins at ACD block 14 and progresses to device or line drivers block 224. From device or line drivers block 224 data goes to data messages block 226 and then to ACD operation set 228. After passing through switch-specific message conversation block 230 and switch-independent state detection block 232, data passes to generic ACD/PBX operations block 236. From generic ACD/PBX operations block 236, data flows to GUI actions for agent instruction independent of GUI block 242, to GUI-1 driver 252 and to further desktop platform 12 to update the status of ACD switch 14 relative to user 246.

If user 246 presses a button to perform an operation such as to initiate a call, data flow begins at user 246 and progresses to GUI-1 driver 252, for example. From GUI-1 driver 252 data flow passes to GUI actions for agent instruction independent of GUI block 242. From block 242 communications go through generic ACD/PBX operations block 236 to GUI actions for statistics independent of GUI block 240 to GUI-1 driver 254 and on to desktop platform 12. This provides to operator 246 an update on the statistics relative to his actions. At the same time, communications from block 242 pass through generic ACD/PBX operations block 236 to switch-independent state detection block 232 to switch-independent specific message conversion block 230. From block 230, data messages block 226 receives the data and instructions for controlling device or line drivers 224 and ultimately ACD 14. This concludes the data flow for response to the agent action example of initiating a call.

Another data flow occurs when the present embodiment launches a new tool, for example, the agent statistics module. Beginning at desktop platform 12, user 246 may desire to launch a new tool by selecting the amounts or other control and appropriate icon associated with the tool. Then, communication flow passes through GUI-1 driver 244 to GUI actions for tool bar independent of GUI block 238. From block 238, communications pass through generic ACD/PBX operations block 238 to GUI actions for statistics independent of GUI block 240. From block 240, instructions and data go through GUI-1 driver 254 back to desktop platform 12.

FIG. 13 shows in more detail the operations that take place within ACD operations block 228. For example, beginning at step 256, code from an arbitrary ACD/PBX, for example, ACD/PBX #i may come into block 228 via block 226 of FIG. 12. From code transfer step 256, various drivers 258 will generate code for changing either the state or the display at the desktop block platform 12. Generic code query 260 performs a routing function to route state change code along path 262 and display change code along path 264. In the event that the code is a state change code, data and instruction flow first goes to update state table block 266. Update state table block 266 depicts communication with update state display block 268. Additionally, update state table information passes to perform state-specific actions block 270. From perform state-specific actions block 270, data and instructions go to update state display block 268, update legends display block 272, and out to ACD/PBX #i driver 258 to send code to the appropriate ACD/PBX via a direct or network connection or via a modem for, or other remote connection. In the event that the generic code is to perform a display change, data and instructions flow from generic code query 260 to update legends display block 272. Update legends display block takes input either from perform state-specific actions block 270 or generic code query 260 to provide input to GUI actions for agent instructions independent of GUI block 242, or GUI actions for took bar independent of GUI block 238. From update state display block 268, communication occurs with phone info from/to host block 274 and wrap info from/to host block 276. Communication from blocks 274 and 276 may occur with an external host or another appropriate application program as indicated by the two-way connection with external host block 250.

OPERATION

Although it is clear how the present embodiment operates based on the above description, for completeness the following description illustrates how one aspect of the present embodiment operates. The example is of an agent receiving an in-bound call. Referring to FIG. 5*a*, the first step is for the agent to determine that he is ready to answer a call. In one embodiment, if AVAILABLE control indicator 81 assumes a green color, then the agent is in the available state. This means that the agent is ready to receive an in-bound call. If, on the other hand, AVAILABLE control indicator 81 is gray and agentstation window 76 is red, then in that embodiment platform 12 is in idle state. This means that although platform 12 is linked into the ACD 14, platform 12 is not available to receive an inbound call. In order to be ready to receive an in-bound call, using mouse control 40 or a keyboard sequence the operator may position the cursor on window 44 to AVAILABLE indicator 81 and click mouse control 40 to turn AVAILABLE control indicator 81 to green. Then, agentstation window 76 will change from its red color to indicate that platform 12 is no longer in the idle state. Upon receiving an in-bound call, CALL-A control indicator 83 may turn a color such as green or may flash. At this point, the preferred embodiment provides to the agent a tone to indicate that the call is being received. Also, display 80 on agentstation window 76 may provide call-type information. This describes an auto-connect feature of the present embodiment.

Another operation of the present embodiment may be the manual connect operation in which an in-bound call causes CALL-A control indicator 83 to flash a color such as yellow. Then, infoset 18 will beep several times to indicate an incoming call. The operator may then click, using mouse control 40 or may use a keyboard sequence, CALL-A control indicator 83 to receive the call. Once the operator clicks CALL-A indicator 83, it may turn green. The agent will receive a sound in headset 20. Again, call-type information may show on agentstation display 80 at this point, as the agent receives the call.

In the auto-connect mode of the present embodiment the operator receives in-bound calls automatically as long as the operator is in the available state. In the manual connect mode, the operator must actively initiate receipt of an in-bound call. A system administrator may set the sign-on screen for the agent in either the auto-connect or manual connect mode. The zip tone that the operator receives is a burst of tone in headset 20 that alerts the agent to a new call being present. There may be various kinds of tones in the present embodiment. For example, one short tone may mean that a normal in-bound call from an outside caller is being received. Two short tones may mean that an in-bound call that is normally handled by an agent in another agent group is being received. A long tone may mean that an extension-directed call is being received. The call-type information is a message that the agent hears over headset 20 when the agent receives a call. It may also be a message that the agent receives on agentstation display 80 when the agent receives a call.

In this example, infoset 18 or a similarly operating device performs two important functions. First it acts a translator between the telephone system and platform 12 so that platform 12 and ACD 14 can understand each other. Secondly, if platform 12 is not energized, infoset 48 operates as a substitute telephone.

To terminate a call, the agent may click AVAILABLE control indicator 81, or click RELEASE control indicator 82. If the agent clicks AVAILABLE control indicator 81, then CALL-A control indicator 83 will turn gray, in this example, and AVAILABLE control indicator will then turn green. This places platform 12 back in the available state and terminates the current call. If the operator clicks RELEASE control indicator 82, then CALL-A control indicator 83, again, turns gray. Then, depending upon how the system administrator has set up the sign-on function, the operator may be in the idle state, wrap-up state or available state. The available state means, as mentioned above, that the agent is ready to receive an in-bound call. The idle state means that the agent is signed on to platform 12, but platform 12 is not available to receive an in-bound call. In this example, platform 12 is in the idle state when agentstation display 80 turns red. In the wrap-up state, the agent is permitted to perform follow-up work relating to the previously received call. An agent cannot receive an in-bound call until the follow-up work is finished. The wrap-up state is indicated by a wrap-up box being shown on screen 44 of platform 12.

To see the statistics relating to a current or preceding call, the agent may click agentstats symbol 135 on orchestralaunch window 131. Platform 12 provides a multi-tasking operating system. As a result, the agent may do more than one thing at a time. For example, the agent can answer telephone calls, rate his or her call-handling performance and place orders all at the same time on platform 12. That is, the agent can see all functions on platform 12 at the same time because each function appears in its own window or screen 44. Therefore, agentstats window 74 provides to the agent a comparison to call handling targets set by agent's supervisor. An example of using agentstats window 74 may be to show in an agent window statistics such as average wrap-up time 112, number of outbound calls window 16, or percent idle time window 2 in different colors. White may mean that the agent is operating satisfactorily in that particular area. A yellow may indicate that the agent needs to improve in that area. A red indicator highlighting or forming a background for the associated agent window can be used to mean that the agent needs to improve immediately in that particular area.

These and other functions are made possible by the present embodiment which provides, in summary, a system for integrating a plurality of call center agent subsystem modules to assist a call center agent in efficiently responding to customer calls and that includes a workstation that has a central processing unit for interfacing the call center agent with a call distribution system. Within the workstation, there are a plurality of modules that are integrated in a way that significantly improves the call center agent's ability to provide completely responsive service to customers. The integrated modules of the present invention deliver, at a single place under the control of the call center agent, voice, data, and/or images by which the agent can completely service a customer call.

The modules include an agent interface module that permits the call center agent to control the interface between the call distribution system and the workstation. Another module in the workstation is an agent productivity statistics module that reports to the agent performance statistics that the agent generates in responding to calls. By generating agent performance statistics in real time, the agent productivity statistics module permits the agent to monitor his or her effectiveness in responding to customer calls. Another module in the present invention is a host applications module that permits the agent to access host applications associated with the call center systems in providing data and images of documents and other sets of information that the call center agent needs to properly respond to the customer calls. The workstation further includes an integration and control module that integrates the functions of the agent interface module, the agent productivity statistics module, and the host applications module as well as other modules within the workstation to substantially improve the performance of the call center agent in servicing both in-bound and out-bound calls through the call distribution system.

Although the invention has been described with reference to the above-specified embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appended claims will cover such modifications that fall within the true scope of the invention.

What is claimed is:

1. A system for integrating a plurality of agent call handling instruments in a single workstation to assist a call center agent in servicing calls through a call distribution system, the integration system comprising:

a workstation having a computer processor, a display, an interface device for coupling said workstation to the call distribution system, a headset coupled to said interface device to allow the call center agent to communicate by audio with the call distribution system, and a memory for storing a plurality of processor implemented computer instructions; and a plurality of modules within the processor implemented computer instructions, said instructions modules further comprising;

an agent interface module for interfacing the agent's headset with the call distribution system through said interface device in supporting both in-bound and out-bound calls, an agent statistic module for generating statistics associated with the performance of the agent in servicing both in-bound and out-bound calls and displaying those statistics on said workstation's display, a host applications module for allowing the customer service agent to access a plurality of host applications programs, said host applications module associated with said agent interface module and said agent statistics module for permitting simultaneous presentation on a single graphical user interface screen on said workstation's display data and images associated with said agent interface module, said agent statistics module, and at least one of said host applications programs, and a control module for controlling said agent interface module, said agent statistics module, and said host applications module.

2. The integration system of claim 1, further comprising a supervisor console module coupled with the call distribution system and the workstation for monitoring the performance of the call distribution system and the agent in responding to calls communicated through the call distribution system.

3. A system for integrating a plurality of call center agent modules to assist a call center agent in servicing calls through a call distribution system, the integration system comprising:

a workstation comprising a display, central processing unit for interfacing the call center agent with the call distribution system, and a headset to allow the call center agent to communicate by audio with the call distribution system; and a plurality of modules coupled to the workstation, the module comprising:

an agent interface module for controlling circuitry between said workstation and the call distribution system to assist the call center agent in audio communication with the call distribution system through the workstation;

an agent statistics module for generating statistics associated with the performance of the call center agent in servicing calls through the call distribution system and presenting the statistics on said display;

a host applications module for permitting the call center agent to access host applications programs associated with said workstation in servicing calls; and an integration and control module for integrating and controlling operations associated with said agent interface module, said agent statistics module, and said host applications module.

* * * * *